(12) United States Patent
Bryant et al.

(10) Patent No.: US 7,920,566 B2
(45) Date of Patent: Apr. 5, 2011

(54) FORWARDING DATA IN A DATA COMMUNICATION NETWORK

(75) Inventors: Stewart Frederick Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 546 days.

(21) Appl. No.: 11/788,106

(22) Filed: Apr. 18, 2007

(65) Prior Publication Data

US 2008/0259923 A1    Oct. 23, 2008

(51) Int. Cl.
*H04L 12/28* (2006.01)
(52) U.S. Cl. .......................... 370/392; 370/351; 370/389
(58) Field of Classification Search .................. 370/392, 370/351, 389
See application file for complete search history.

(56) References Cited

U.S. PATENT DOCUMENTS

| | | | |
|---|---|---|---|
| 5,726,984 A * | 3/1998 | Kubler et al. | 370/349 |
| 5,812,524 A * | 9/1998 | Moran et al. | 370/228 |
| 7,433,301 B2 * | 10/2008 | Akahane et al. | 370/218 |
| 7,457,248 B1 * | 11/2008 | Ali et al. | 370/235 |
| 2003/0152024 A1 * | 8/2003 | Yang et al. | 370/216 |
| 2006/0159009 A1 * | 7/2006 | Kim et al. | 370/216 |
| 2006/0187819 A1 | 8/2006 | Bryant et al. | |
| 2007/0201355 A1 * | 8/2007 | Vasseur et al. | 370/217 |

OTHER PUBLICATIONS

Bryant et al., "Forwarding Data in a Data Communications Network," U.S. Appl. No. 11/526,933, filed Sep. 25, 2006 (unpublished).
C. Hedrick, "Routing Information Protocol," IETF Network Working Group Request for Comments (RFC) 1058, Jun. 1988, published by The Internet Society, 27 pages.
G. Malkin, "RIP Version 2 Carrying Additional Information," IETF RFC 1723, Nov. 1994, published by The Internet Society, 8 pages.
E. Rosen et al., "Multiprotocol Label Switching Architecture," IETF RFC 3031, Jan. 2001, published by The Internet Society, 50 pages.

* cited by examiner

*Primary Examiner* — Pankaj Kumar
*Assistant Examiner* — Gautam Sharma
(74) *Attorney, Agent, or Firm* — Hickman, Palermo, Truong & Becker LLP (57) ABSTRACT

An apparatus for forwarding data in a data communications network having as components nodes and links therebetween is described. The apparatus is arranged to forward data towards a destination on a label switched path and advertise in a label advertisement to nodes in the network in a label advertisement its label for the label switched path and its label for a repair label switched path for use in the event of non availability of a component in the network. The apparatus is further arranged to advertise to a remote node in the network in a label advertisement additional information for deriving repair label switched path information at the remote node.

32 Claims, 9 Drawing Sheets

---

700 ADVERTISE LABEL FOR LSP

702 ADVERTISE REPAIR LABEL

704 ADVERTISE ADDITIONAL INFORMATION

```
┌─────────────────────────────────┐
│           400                   │
│       RECEIVE TUPLE             │
└─────────────────────────────────┘
              │
┌─────────────────────────────────┐
│           402                   │
│       CONSTRUCT LFIB            │
└─────────────────────────────────┘
              │
┌─────────────────────────────────┐
│           404                   │
│      RECEIVE PACKET ON LSP      │
└─────────────────────────────────┘
              │
┌─────────────────────────────────┐
│           406                   │
│      SWAP LABEL AND FORWARD     │
└─────────────────────────────────┘
```

FIG. 4

| Lin 500 | Lout 502 | NEXT HOP 504 |
|---------|----------|--------------|
| $A_D$   | $B_D$    | B            |
| $A_F$   | $B_F$    | B            |

//www.w3.org/1999/xhtml">
FORWARDING DATA IN A DATA COMMUNICATION NETWORK

FIELD OF THE INVENTION

The present disclosure generally relates to data communications networks. The disclosure relates more specifically to forwarding data in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

If a component in the network fails or is otherwise computed as unavailable (for example as being deliberately removed from the network), such as a link or a node, then packets may be lost until the network re-converges as some nodes in the absence of repair mechanisms may attempt to forward packets down failed routes. Accordingly various proposals have been presented for "fast reroute", that is, rerouting of packets without awaiting convergence, in LDP. Such proposals include laying in a primary and a repair LSP, or performing primary forwarding using link state techniques and repair routing along an LSP. However existing schemes require complex route calculation or label distribution schemes.

DETAILED DESCRIPTION

An apparatus and method for forwarding data in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for forwarding data in a data communications network
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises an apparatus for forwarding data in a data communications network having as components nodes and links therebetween. The apparatus is arranged to forward data towards a destination on a label switched path and advertise to nodes in the network, in a label advertisement, its label for the label switched path and a repair label for a repair switched path for use in the event of non availability of a component in the network. The apparatus is further arranged to advertise to a remote node in the network in a label advertisement, additional information for deriving repair label switched path information at the remote node.

In other aspects, the invention encompasses a computer apparatus and a computer-readable medium configured to carry out the foregoing steps.

2.0 Structural and Functional Overview

Figure 1:
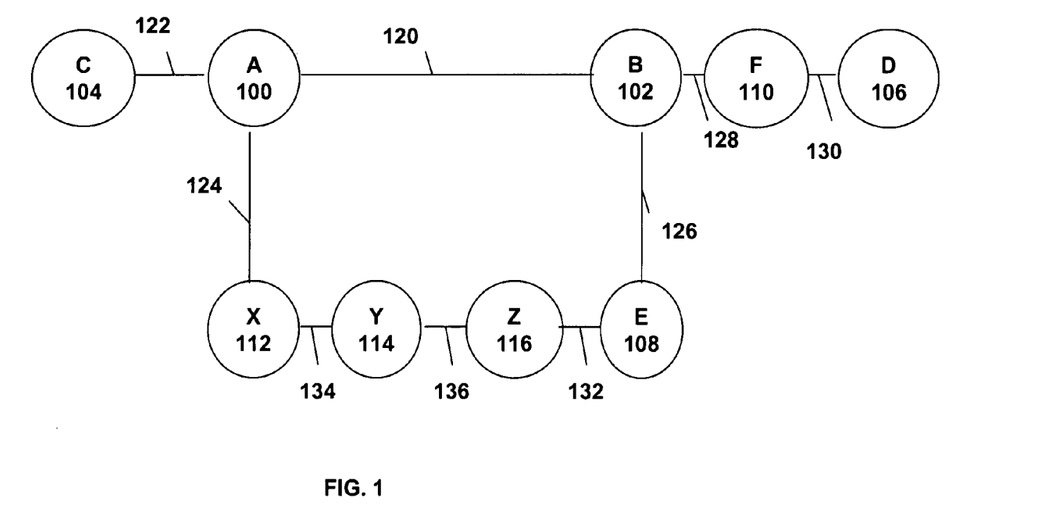
FIG. 1 is a representation of a network to which the approach described herein can be applied.

The various protocols and paradigms referred to herein can be further understood with reference to FIG. 1 which is a network diagram showing a data communications network having as components nodes and links therebetween. Of course the network topology shown is FIG. 1 is merely an example and any appropriate complexity of topology can be accommodated. The network shown in FIG. 1 includes nodes A, B, C, D, E, F, X, Y, Z reference numerals 100, 102, 104, 106, 108, 110, 112, 114, 116 respectively. Node A is joined to nodes B, C and X by links 120, 122, 124 respectively. Node B is connected to nodes E and F by links 126, 128 respectively. Node D is connected to node F via link 130. Node E is connected to node by link 132 and node Y is connected nodes X and Z by links 134, 136 respectively. All of the links shown have a cost one. As a result, for example, node A will compute its least cost path to node D as being via nodes B and F at cost 3 and so forth.

Another class of routing protocol comprises Routing Vector Protocols according to which the path to a network destination is determined based on a reachability metric. One such protocol comprises a distance vector protocol such as the Routing Information Protocol (RIP) which is described in Internet Engineering Task Force (IETF) Request for Comments (RFC) 1058 and in RFC 1723.

Referring once again to FIG. 1, in order to forward data to each destination in the network, each node must compute its next hop on the basis of some form of least cost path. According to RIP, in order for a node in the network to derive this information, each node advertises to its neighbors a reachability metric indicating its cost to each destination. Accordingly, in FIG. 1, for example node A will advertise to nodes C and X its reachability to each of destinations B, C, D, E, F, X, Y, Z. It can be seen that a cost of one will be advertised for reaching nodes B, C and X, a cost of two for reaching nodes F, Y and E and a cost of three for node D. Of course only the lowest cost route is advertised. In a similar manner the other nodes will advertise information to their neighbors which will be based in part upon reachability information that they receive. It will be seen that this approach will be iterative as each node receives further information propagated hop by hop through the network. Eventually, however each node converges on a least cost value for each destination.

In addition each node will store the corresponding next hop, that is, the neighbor node to which it must forward a packet for a given destination along the least cost path, once it has converged and based on the information received from its neighbors. Hence it will be seen that if node B receives a packet for destination D then its next hop is of course node F. If a packet is received at node B with destination node C then the next hop is node A as the cost via node E would be higher.

In a network, multiple routing protocols may be supported and multi-protocol label switching (MPLS) has been developed allowing paths to be constructed independent of the underlying routing protocol.

MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are pre-pended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the next hop router on the path as determined from its IP routing table. Alternatively Resource Reservation Protocol (RSVP) can be invoked in which case, for example, a network administrator can engineer a path, providing strict source routing.

Figure 2:
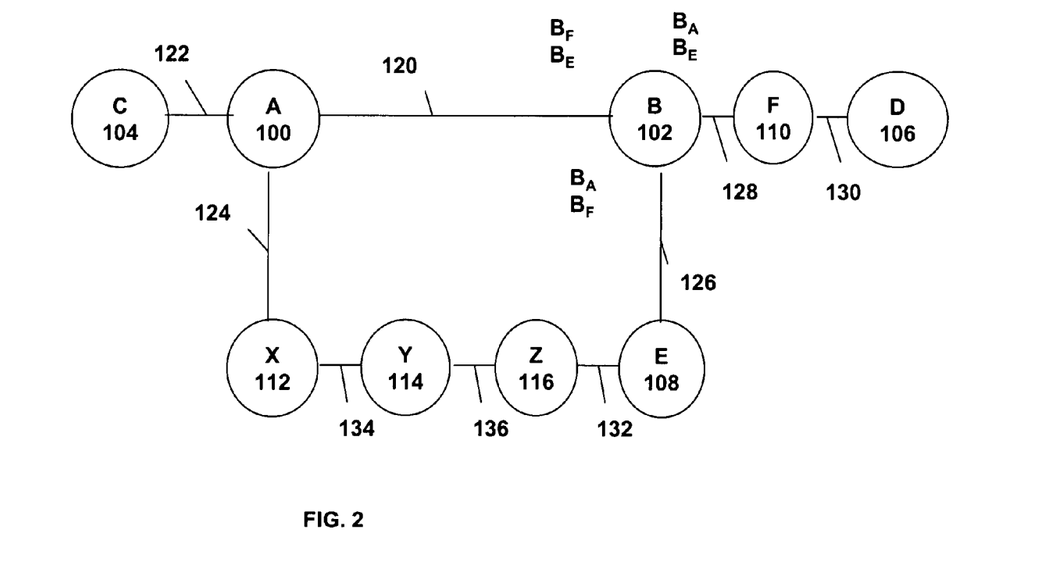
FIG. 2 is a representation of a network of FIG. 1 in MPLS.
Figure 3:
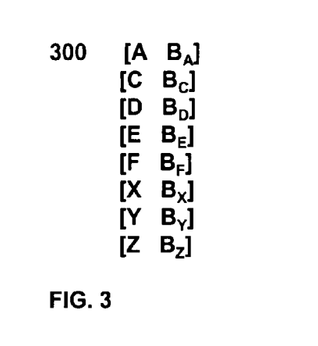
FIG. 3 is a diagram showing conventional LDP advertisement tuples.
Figure 4:
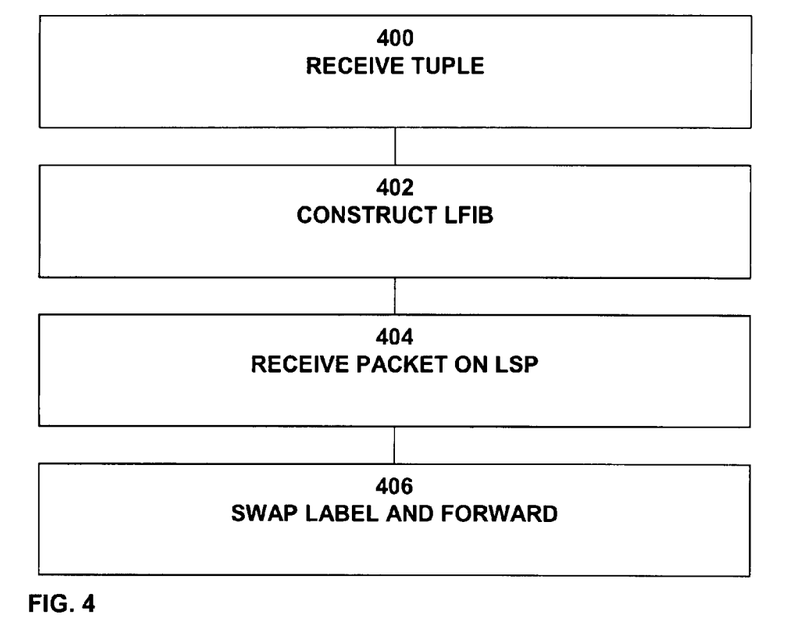
FIG. 4 is a flow diagram illustrating steps performed according to an MPLS approach.

The manner in which forwarding is achieved in MPLS can be further understood with reference to FIG. 2 which shows a network as described with FIG. 1 in an MPLS context, FIG. 3 which shows label advertisement tuples advertised by node B and FIG. 4 which is a node diagram illustrating steps performed at node A.

According to LDP node B will have transmission control protocol (TCP) sessions with each of its neighbor nodes A, F, E and uses these to exchange label information. For example it will send tuples of the type shown in FIG. 3, each indicating a network destination and the label which node B wishes to receive as an ingress label $L_{in}$ for packets for that destination. Hence the tuples as shown in FIG. 3 include a first tuple 300 [A $B_A$], indicating that for packets destined for node A, node B expects to receive an ingress label BA. Similarly the tuples include [C $B_C$] and so forth for each other destination.

Figure 5:
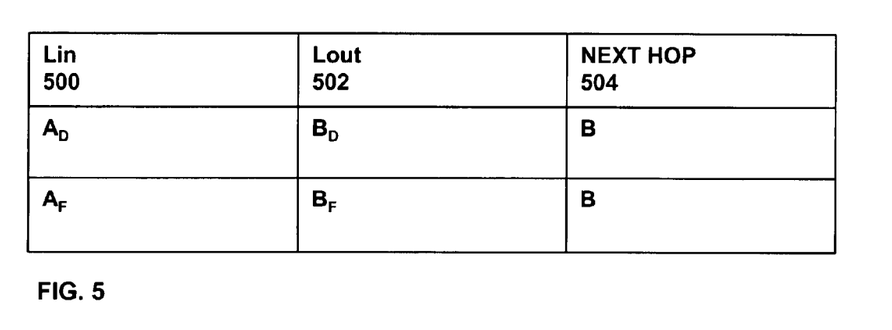
FIG. 5 is a table illustrating an LFIB at a node implementing MPLS.

Referring to FIG. 4, node A receives the tuples at step 400 and, at step 402 constructs its label forwarding information base (LFIB). FIG. 5 shows a LFIB table stored at node A including an ingress label ($L_{in}$) column 500, an egress label $L_{out}$ column 502 and the corresponding next hop column 504. Node A will have also advertised its tuples for the various destinations for example its label AD for destination D, AF for destination F and so forth. The LFIB hence includes the respective incoming label per destination in column 500, the label which needs to be switched or "swapped" as egress label at column 502 and the next hop at column 504. The next hop, according to MPLS, is computed according to the underlying routing protocol using additional routing information available to the node as discussed above. For example in the case of link state forwarding, each node can compute from it LSDB the next hop for the destination corresponding to the tuple allowing a label switched path to be constructed. In the case of routing vector routing protocols such as a distance vector protocol, once again the next hop can be derived from the advertised reachability metrics from the other nodes.

Referring to FIG. 4, therefore, it will be seen that an apparatus for forwarding data such as a node or router is arranged to forward data towards a destination on an LSP having advertised in one or more LDP advertisements its label for the LSP to nodes in the network. Then, when the node receives a packet it can simply consult the LFIB, remove the ingress label, replace it with the corresponding egress label and forward the packet to the next hop where the process will be repeated. For example referring to FIG. 5, where node A receives a packet destined for node D it will carry an ingress label $L_{in}$, $A_D$. It will then swap the egress label $L_{out}$, BD, and forward it to node B.

According to the approaches as described herein a link state method and a routing vector or distance vector method are described allowing enhancement of MPLS/LDP to support fast reroute allowing a single protocol to be used to distribute labels and reroute information such as additional information and/or in a predetermined manner for deriving repair label switched path information. Furthermore the scope of the repair domain is equal to the entire MPLS domain rather than being restricted to the domain of any particular routing protocol which may be a subset of the MPLS domain.

Figure 6:
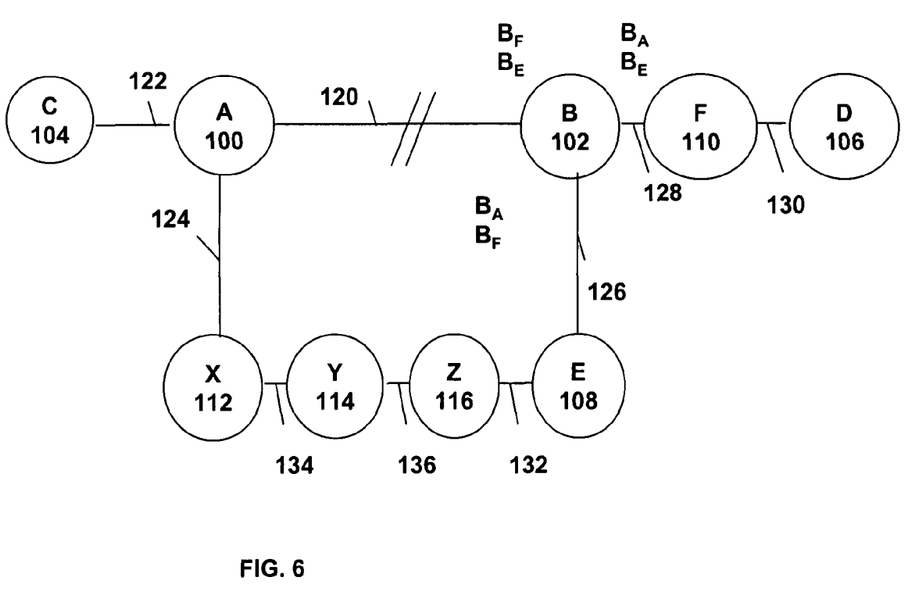
FIG. 6 is a network diagram corresponding to FIG. 2 but with a component failed.

Referring to FIG. 6, which is a network diagram corresponding to that of FIG. 1 and FIG. 2, but illustrating a failed component, the approaches described herein can be understood in overview. In particular it will be seen that in FIG. 6, link 120 between nodes A and B is treated as a failure component or otherwise a non-available component. Hence it will be seen that upon failure in order not to lose packets node A must reroute packets destined for, inter alia, nodes B, F and D via nodes X Y and Z. As is well known, in addition, such packets must not loop back to node A. For example if node A simply forwards a packet for node F to node X and node X has not yet recomputed its forwarding information to take into account failure of link 120 then it may simply send the packet back to node A, as its current computed next hop, creating a loop. Accordingly the approach described herein allows pre-computation of repair routes allowing rerouting to take place while the network is still converging, that is, fast reroute. The method may be implemented before the network even starts converging as a temporary repair for a failure which is quickly repaired.

Figure 7:
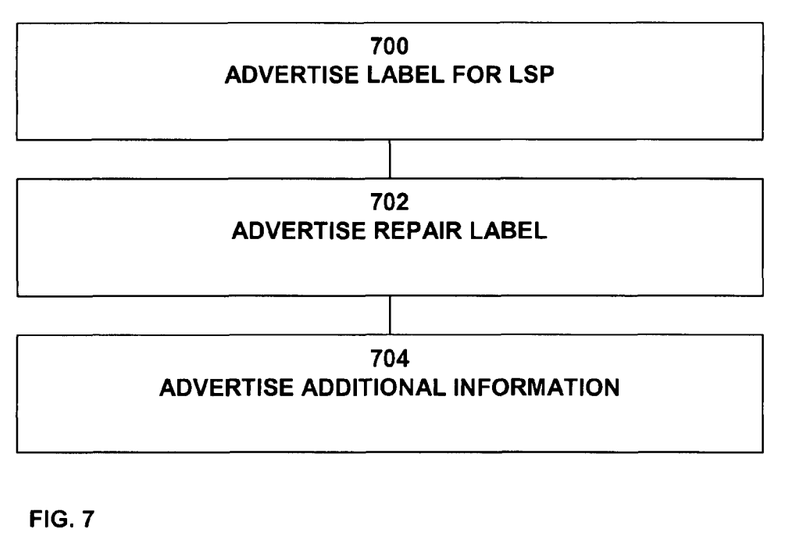
FIG. 7 is a flow diagram illustrating at a high level steps according to the approach described herein.

This can be further understood with reference to FIG. 7 which is a flow diagram illustrating at a high level steps performed according to the approach described herein. At step 700, an apparatus for forwarding data such as a router or node, node B is arranged to forward data implementing MPLS towards a destination on a label switched path. Node B advertises its label for the LSP at step 700 and also advertises a repair label for a repair LSP for use in the event of non availability of a component in the network at step 702. The repair label may correspond to a repair address such as an IP repair address which provides a repair path to the advertising node reachable not via a non-available component as described in more detail below.

At step 704 the node is further arranged to advertise to a remote node in the network, such as repairing node, node A, additional information for deriving repair LSP information at the remote node. As discussed below in more detail, in the case of link state this may include additional information that would typically be found in a link state packet such that this is flooded through the network allowing the appropriate routing and forwarding decisions to be made. In the case of distance vector this can include, for example, the repair label to be used in which case, as described in more detail below, the manner of propagation of the additional information advertisement can additionally assist in constructing the repair LSP. It will be noted that the labels adopted can be of any appropriate form such as a global (to the network or MPLS domain) labeling scheme or a local (per interface or per platform) labeling scheme.

Figure 8:
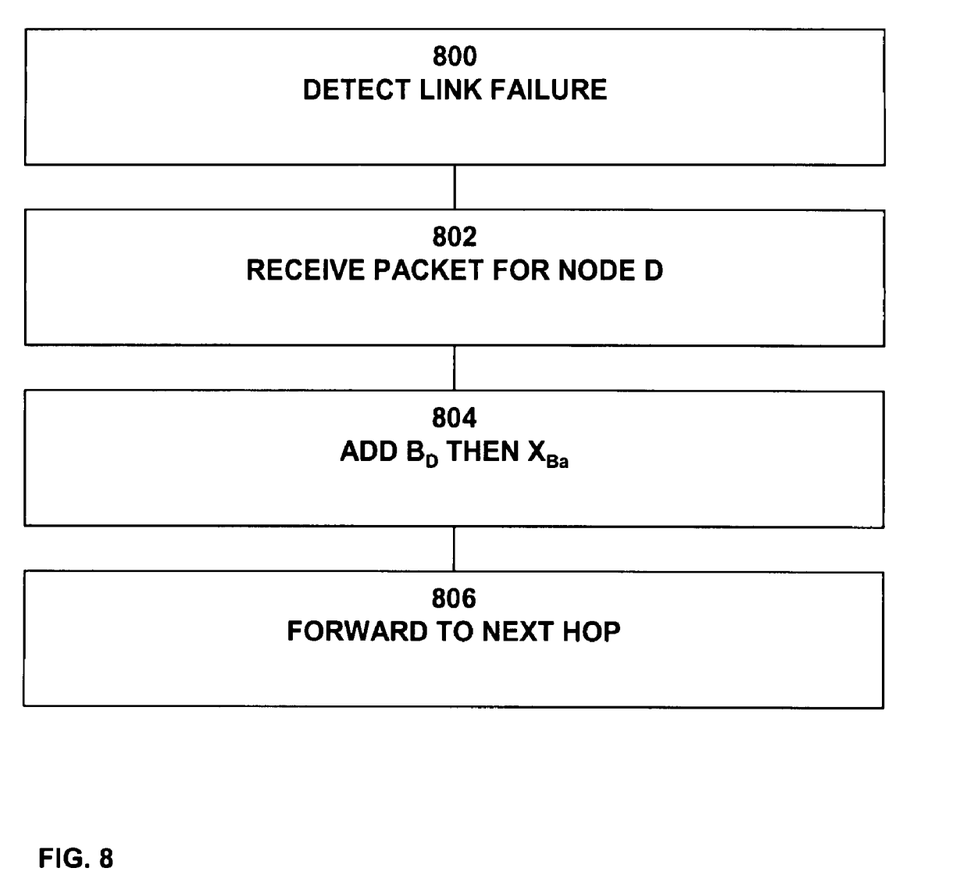
FIG. 8 is a flow diagram illustrating at a high level steps performed according to a not via repair approach described herein.

The manner in which the repair LSP is constructed can be further understood with reference to FIG. 8 which is the flow diagram illustrating the steps performed at a repairing node, node A, and FIG. 6.

One known manner in which a repair path is constructed and propagated is by giving each node/interface (i.e., its connection to each link to adjacent nodes), in addition to its normal address, a repair address capable of propagation and which is reachable via a repair path not via the failure component, sometimes termed a "notvia address". For example node B may have repair addresses B notvia A (represented here as Ba) and B notvia C (Bc). Each other node will have computed its next hop for each of the notvia addresses. Hence when node A detects failure of link 120 it tunnels subsequent packets for node B to address Ba for which its next hop is node X. Node X, having pre-computed its next hop for Ba will forward the packet to node Y and so forth. It will be noted that node A. Forward the packet to Ba by tunneling it to that address. Similarly any packets received at node A for node F or D will also be tunneled to Ba. Upon decapsulation of the packet at node B it will then be forwarded normally from node B to node for C following the original path.

The manner is which repair is implemented in the context of the method described herein, using the "not via address" approach is shown in FIG. 8 referring to packets arriving at node A destined for node D after failure of link 120. In that case it would be seen that the repair path required is A X Y Z E B.

At step 800 the repairing node, node A, detects link failure in any appropriate manner and instigates its repair LSP which is computed according to a link state or routing vector approach as described in more detail below. At step 802, upon receipt of a packet destined for node D, node A first pushes the label which the repair end point node, node B, would require to forward the packet to its destination (D) using B's normal forwarding path and then pushes the label corresponding to the not via address or repair LSP required to effect the repair. In the embodiment described, for example, node A will first push B's label for D $B_D$ then the label for the repair path. As the next hop node on the repair LSP is node X, the corresponding label will be X's label for B not via A, that is, $X_{Ba}$ at step 806 the packet is then forwarded to the repair next hop, node X, where the top label $X_{Ba}$ is swapped for Y's repair label $Y_{Ba}$ and forwarded on along the B notvia A repair path.

At arrival at node B the top label is stripped and the packet is forwarded according the next label $B_D$ on to node F and hence to node D. Of course known techniques such as "penultimate hop popping" (PHP) whereby the top label is stripped at the preceding node to node B, node E, can be implemented as will be well known to the skilled reader to reduce the label processing requirement at node B.

It will be seen, therefore, that each node is able to forward packets using MPLS conventionally or along a repair LSP. However a remote node such as a repairing node requires additional information for deriving repair LSP information. As described below this can be dependent on the underlying protocol supported at the node, but rely on information derivable from the label distribution mechanism adopted.

For example in the case of computing the repair path according to a link state protocol, the additional link state information can be incorporated into an LDP advertisement for example in a type length value (TLV) field. In the case of a distance vector protocol then once again appropriate information such as the repair label for the advertising node can be incorporated in an LDP message but in addition the manner in which the LDP message is propagated can be designed to aid the computation of the repair path at the repairing node.

Figure 9:
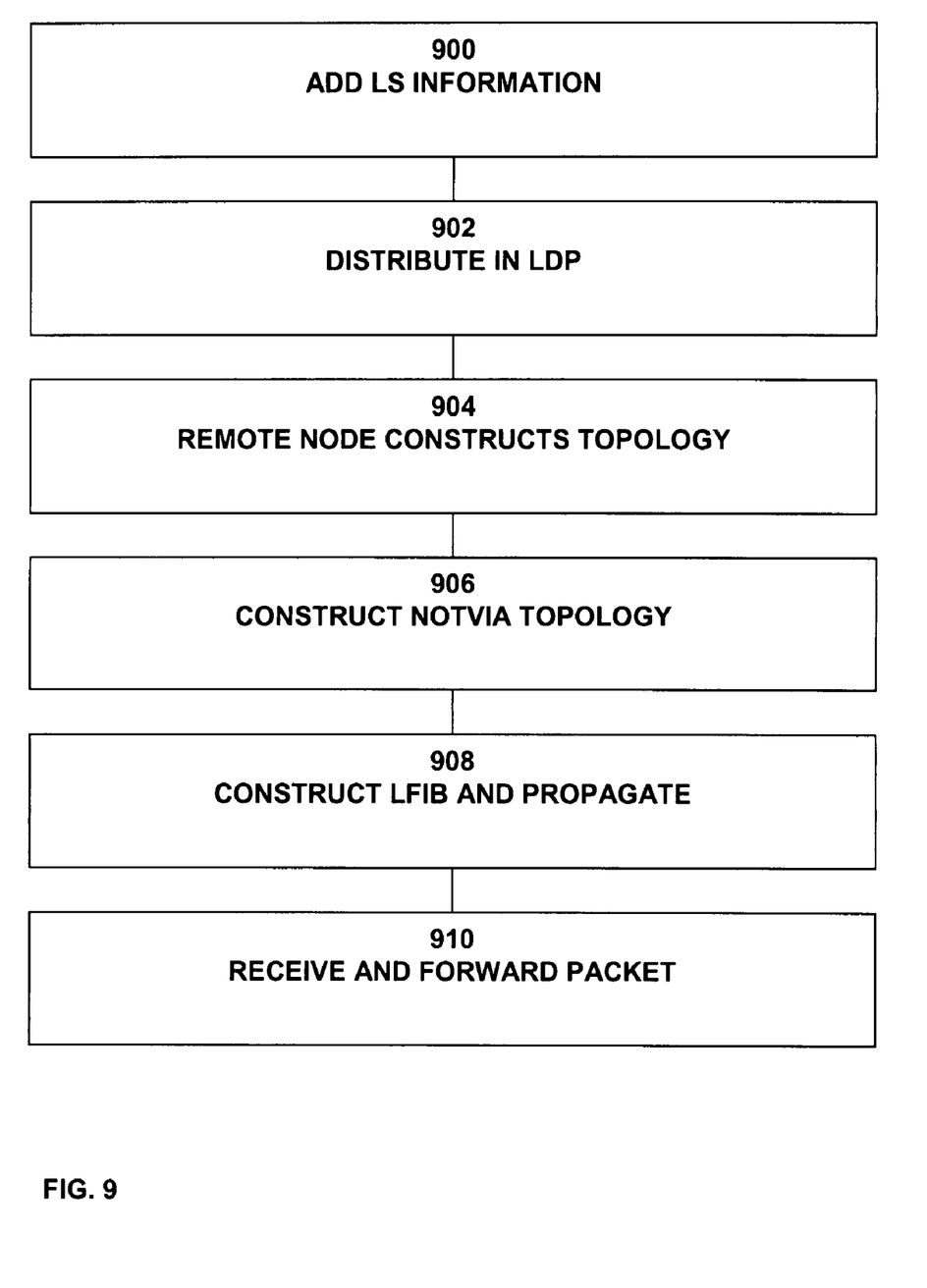
FIG. 9 is a flow diagram illustrating at a high level steps performed according to a link state implementation of the present approach.

Accordingly turning firstly to the link state approach, FIG. 9 illustrates the steps performed by nodes in the network. At step 900 link state information such as the IP address of the originating or advertising link state router, the IP address of each neighbor, the not via IP address corresponding to each neighbor and the cost to each neighbor can be incorporated into an LDP advertisement and propagated at step 902 throughout the LDP domain in a manner similar to that used in a link state protocol.

At step 904 a remote node such as a repairing node constructs the topology from the link state information extracted from the LDP message and derives the LSP repair path information therefrom. For example the node can construct a complete topology from the information received from each node including it neighbors and the cost to each neighbor. In addition the repairing node can construct its next hop/LSP repair path component to a given not via address by failing the failure component adjacent to the not via address in a not via topology and then computing at step 906 its forwarding information according to link state techniques. The LSP for the not via address will then be laid in automatically according to the LDP protocol, suitable labels being distributed and installed in the conventional manner known from MPLS.

At step 908 therefore, the LFIB at the repairing node is populated in relation to the not via address such that when a packet arrives requiring tunneling to the not via repair address around a failure, it is simply installed into the not via repair path. Upon arrival at subsequent nodes in the path they will also have installed the LSP repair path such that the packet will be forwarded to the repair end point in the manner described above.

As a result of adding the necessary link-state not-via information to LDP, the not via repair path can be computed without recourse to the underlying routing protocols providing the determinism and simplicity of the not-via method of calculating repairs but with the scope of LDP and merely requiring modifying the LDP protocol.

Figure 10:
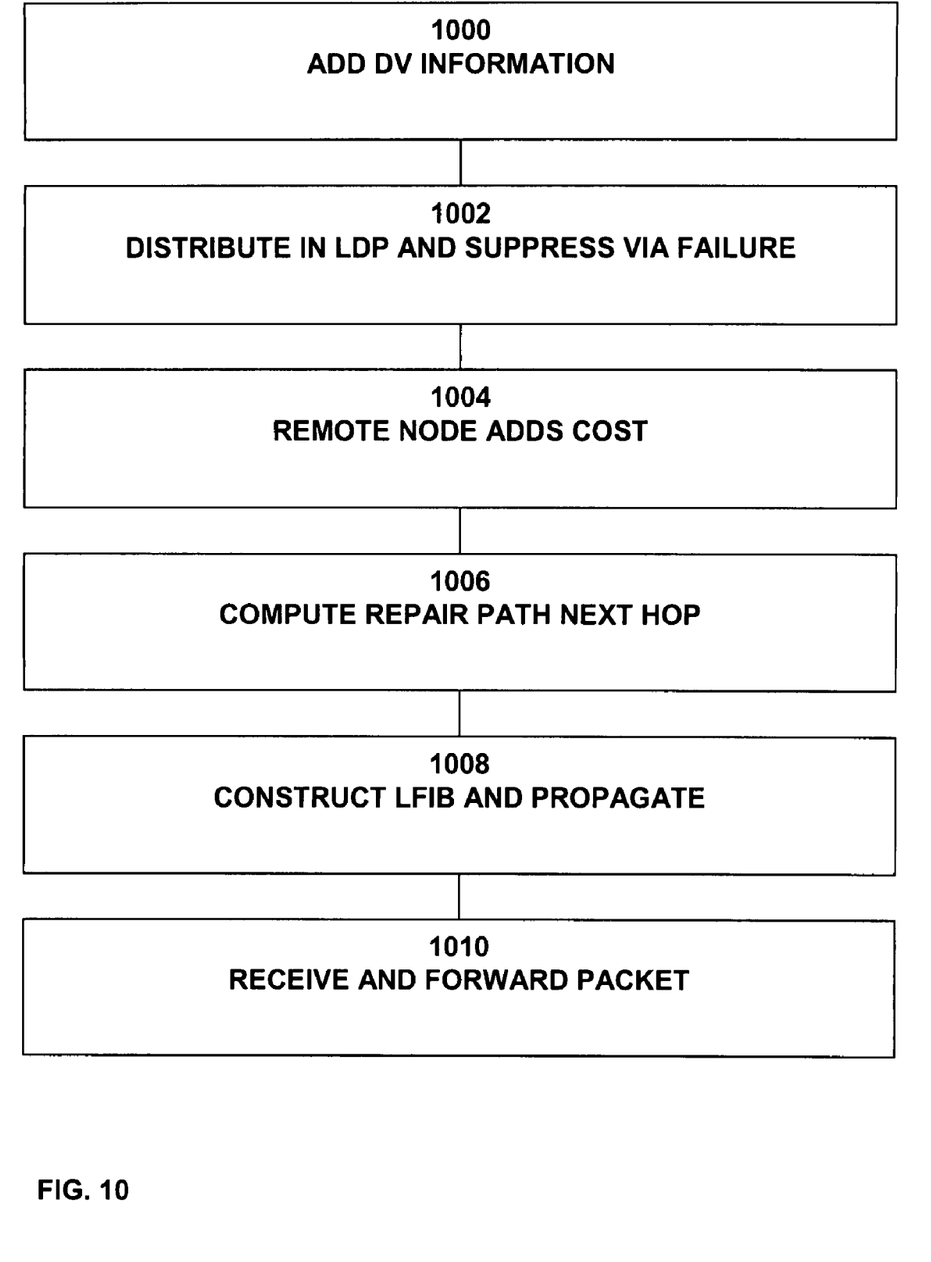
FIG. 10 is a flow diagram illustrating at a high level steps performed according to a routing or distance vector implementation of the present approach.

A distance vector approach can be understood in overview with reference to FIG. 10. At step 1000 an advertising node such as node B adds into an LDP message for example in a TLV its own IP address, the IP address of a repairing node, for example node A, as the node at the far side of the link to be repaired around, a cost value of zero and the label to use for the repair.

At step 1002, according to a first approach, node B then advertises the additional information for deriving the repair LSP information at the remote node along all interfaces except the link to be repaired around, that is the failure component or non available component link 120 between nodes A and B in the embodiment shown. In other words node B sends the advertisement to nodes E and F but not node A. According to a second approach, node B can send the additional information advertisement to all of its neighbors, nodes A, F and E, but node A can delete the relevant information from the received LDP message and propagate it no further. The relevance of this differential treatment of the advertisement will be described in more detail below.

At step 1004, as each node receives the LDP not via link repair message it adds its own costs of the link over which the advertisement was received, stores the information and forwards the advertisement on.

As a result it will be seen that each node obtains from the additional information sufficient information to allow it to perform a routing vector computation, namely the cost from its neighbor node to each destination node in the network.

At step 1006 a repairing node such as node A, recognizing its own IP address in the repair advertisement, derives repair LSP information including its repair path next hop for the repair address. In particular in will be seen that because the repair advertisement was not forwarded along the failure component (or suppressed at the far end of the failure component (at node A)) node A computes its repair next hop based on an effective topology omitting the failed link. Accordingly, upon failure of the failure component, no node in the network attempts to reach node B via the failure component and the repair path is correctly computed by the routing protocol as part of its ordinary convergence process. At step 1008 the LFIB at the repairing node is updated accordingly and at step 1010, upon failure of the component 120 and receipt of a packet which normally would have traversed that component, the repairing node sends the packet along the repair LSP.

Accordingly by adding the necessary distance vector not-via information to LDP, the not via repair paths can be calculated using LDP without recourse to the underlying routing protocols once again providing the determinism of the not via method of calculating repairs but with the scope and simplicity of modified LDP protocol.

As a result of this approach LDP can be implemented as a pseudo routing protocol where link state or distance vector techniques can be used to calculate repair paths within LDP allowing a consistent fast reroute repair path construction mechanism to be implemented even if mixed routing protocols are covered in the LDP domain D. Of course the approach as described can be implemented for link or node repair and further implementation aspects are described below.

3.0 Apparatus and Method for Forwarding Data in a Data Communications Network

The use of "notvia addresses" for creating repair paths is described, for example in co-pending patent application Ser. No. 11/064,275, filed Feb. 22, 2005, entitled "Method and Apparatus for Constructing a Repair Path around a non-available Component in a Data Communications Network" of Michael Shand et al., ("Shand et al.") the entire contents of which are incorporated by reference for all purposes as if fully set forth herein.

The manner in which the techniques described here can be implemented in a link state environment can be understood with reference to the failure scenario shown in the network topology of FIG. 6 in the case of link repair, in the case where link 120 fails and node A receives packets destined for node D which would otherwise have to traverse the link 120 taking the lowest cost route via node B. In this case node B will have advertised to node A its tuple for node D [D $B_D$] and in addition propagated in a label advertisement, for example an LDP TLV, information of the type:

```
Type Reroute-Link-State{
    The IP address of the originating LSR
    The IP address of each neighbor
    The not-via IP address corresponding to each neighbor
    The cost for this LSR to reach each neighbor
    Sequence number of this Reroute-Link-State information
    SRLG membership identifier if appropriate
    Optionally the checksum of this Reroute-Link-State information}
```

Hence the TLV will include node B's IP address, the IP addresses of nodes A, E, F and node B's not via addresses $B_a$, $B_f$ and $B_e$. In addition the cost to each of nodes A, E, F is included as well as a sequence number for the LSP or reroute link state information. The shared risk link group (SRLG) membership identifier can be used in the event that the failure component comprises one of a group of failure component which would be expected to fail concurrently and hence would be treated as a single failure omitted from any not via computation topology course the check such can be incorporated for improved data integrity.

This per node information can be reliably propagated and managed throughout the LDP domain in a manner similar to that used in a link state routing protocol such as intermediate system to intermediate system (is-is) or open shortest path first (OSPF) as will be well known to skilled reader such that a detailed description is not required here. In particular the LDP advertisement is flooded through the entire network. However because LDP runs over TCP, the transfer of information is reliable, and so some of the complexity of the IS-IS or OSPF update process to ensure reliability is not needed. As a result each node receives information from every node in the network allowing it to construct its LSDB and hence its FIB.

In addition each not via address will be propagated by node B together with its label for that address as a conventional LDP tuple propagated in the usual manner, [B $B_{Ba}$], using the normal LDP mechanism. Hence, in addition to having the complete set of adjacency and cost information from which node A can reconstruct the topology it can also execute the not via calculations described above and in Shand et al.

Figure 11:
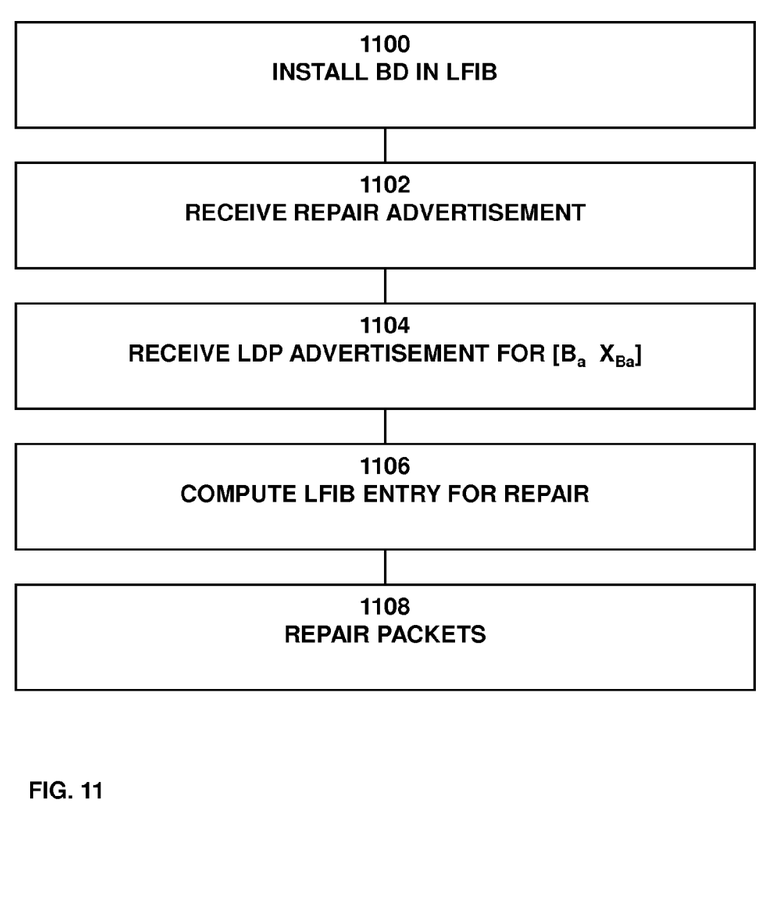
FIG. 11 is a flow diagram illustrating in more detail steps performed at a link state receiving node.

Referring for example to FIG. 11 which shows in more detail the steps performed at the repairing node, which is node A in the link state implementation, at step 1100 node A receives B's label for D $B_D$ and installs it in its LFIB as an egress label against the appropriate ingress label and with next hop B. At step 1102 node A additionally receives the repair information advertisement and extracts from it the not via address Ba. It step 1104 node A receives the LDP label advertisement corresponding to an LSP for destination Ba for example from node X which will have computed its own next hop towards Ba and its label $X_{Ba}$.

At step 1106 node A computes its next hop for the not via address Ba. This is done according to any appropriate technique for example the work described in Shand et al. such that a detailed is not required here. In summary, however, node A recognizes the semantic of IP address Ba and computes its next hop according to a not via repair topology from which the corresponding failure component, link 120 has been removed. As each other node also recognizes the semantic all nodes compute their not via next hops from a consistent view of the not via repair topology such that looping is avoided. Node A then computes its LFIB entry for packets that would otherwise traverse the failure link, for example packets destined for node D, with the ingress label AD, A's label for D, egress label $X_{Ba}$, X's label for Ba and next hop node X.

At step 1108, on detection of failure of link 120, if node A receives a packet destined for node D (or which would otherwise would have traverse the failure component) node A removes the ingress label, pushes B's label for $D_{Bd}$ and pushes on that to X's label for the LSP $X_{Ba}$ and forwards the packet to node X. From there node X performs normal MPLS forwarding along the repair path by swapping the outer label and the packet arrives at node B as described above. Node B then forwards on to node D as appropriate. Of course the approach can be scaled to any number of destination nodes reachable via node B, node A merely needing to recognize that the packet would have to traverse the failure, the identity of repair end point (node B) and B's required label.

Although the discussion above is presented in relation to link repairs it will be seen that the approach can equally well be used in the case of node repair, that is, where the failure component is a node for example on the primary path between a repairing node and a repair end point node. In that case either the failure component can have a node failure not via address the semantic of which is recognized by other nodes as requiring that it is treated as removed together with all of its links to adjacent nodes, or the not via address can be computed by treating all of the adjacent links to the failure node as a failed SLRG as described in Shand et al.

Node A includes in its LFIB forwarding information allowing it to repair appropriate packets for respective destinations which would have traversed each of the failed nodes neighbors. In addition the repairing node A will require the repair end point's label for each of the destinations that it served in order that these are recognized by the neighbor nodes to which the repair is constructed. This could be obtained in any appropriate manner for example a directed LDP session with each of node P's neighbors or any other appropriate approach.

According to one approach this information can be provided as part of the additional information label advertisement TLV as described above. Yet further because of the approach described, as the TCP connections carrying LDP provide reliable transmission, the link-state-update process may optionally be run unacknowledged.

Figure 12:
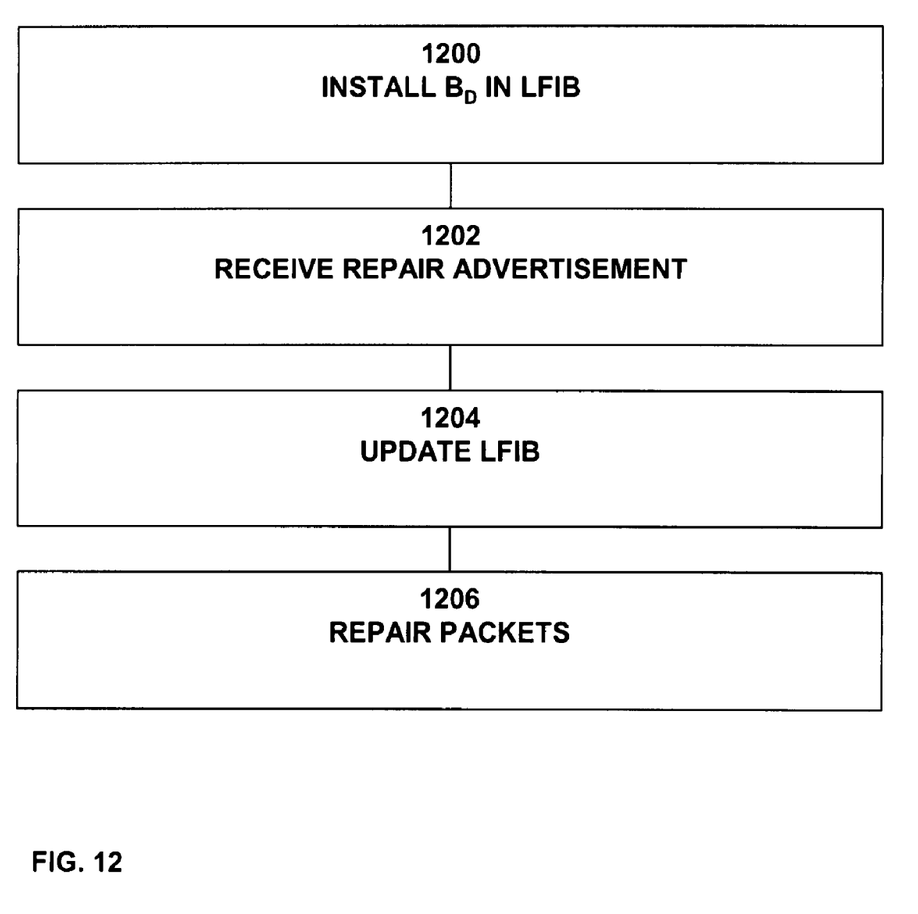
FIG. 12 is a flow diagram illustrating in more detail steps performed at a distance routing vector receiving node.

Turning to a distance vector implementation, the approach can be understood in more detail with reference to FIG. 12 which is a diagram illustrating the steps implemented in putting the method into effect. The use of routing vector procedures is described, for example, in co-pending patent application Ser. No. 11/526,933, filed 25 Sep. 2006 entitled "Forwarding data in a data communications network" of Stewart Bryant et al. ("Bryant et al.") the contents of which are incorporated by reference for all purposes as if fully set forth herein.

According to the scenario in FIG. 6 in which link 120 between nodes A and B comprises a failure or non-available component and packets arriving at node A require forwarding to node D, at step 1200 node A receives node B's label from node D $B_D$ and installs it in its LFIB with next hop B and ingress label AD for normal forwarding. At step 1202 node A receives the repair information advertisement. This can be for example in the form of a TLV or other attachments to an LDP message and can contain information such as:

---

{TYPE = LDP not-via link repair information
B - its own IP address
A - the IP address at the far side of the link
Cost
Label - Label to use for the repair
Flush = false}

---

In addition to the type identification, the notification carries the IP address of the advertising node (node B) and the repair node (node A) allowing specification of the destination address not via the failure, fully defining the not via component. In addition the advertisement carries a cost value that is set at 0 at the advertising node but augmented at each node by an amount equivalent to the cost of the link over which the node received the advertisement such that the cost thus represents the total cost from the receiving node to the advertising node. The advertisement further includes the label to be used for the repair. At the point of advertisement, for example, this is node B's label for Ba, $B_{Ba}$. At each subsequent node this is replaced by that node's own label for the repair LSP such that the value received by node A from node X is $X_{Ba}$.

In addition a flush value of false is incorporated in to the advertisement. As described more detail below, when the value is set to true this allows removal of a failed link as is known from routing vector protocols and described in more detail below.

As indicated above, the additional information label advertisement is propagated by the advertising node down all links/components other than that around which the repair will be formed, or conversely the advertisement can carry a differentiating characteristic such as a "suppress" field value such that each adjacent component the other side of the failure component can suppress processing of propagation of the advertisement. As a result the subsequent LSP repair path computations are based on an effective topology excluding the failure component as described in more detail above and in Bryant et al.

For example, therefore, node E will send an advertisement including its corresponding cost for example cost 1 and its label Ba, $E_{Ba}$ as well as the appropriate flush state. As each successive node sends the amended advertisement the cost is augmented until the information block received by node A includes node B's address, its own address, a cost of four (which it will then increase by one because of the link cost X A) node X's label for Ba, $X_{Ba}$ and the appropriate the flush state.

At step 1204 the receiving or repairing node, node A, adds its own cost to that of the adjacent router that forwarded the information block and stores it as described above.

As the additional information advertisement is propagated through the network all components for example node A, will receive the additional repair information from all neighbor nodes except via the failure component providing candidate repair routes. The receiving node can then examine the repair cost received from all of the adjacent routers (including its own link cost to that router) and determine which is cheapest. For example node A will store the first received value and only replace it when a lower value is received. If the cost has changed, therefore, the MPLS label in the block is replaced by the node's own label and the new additional information advertisement is propagated to all neighbors entitled to receive it. The additional information label advertisement is then propagated to all adjacent routers optionally excluding the one from which the advertisement was received allowing further propagation of the information, but with the cost value and replacement label included.

In addition the node makes any necessary changes to its LFIB, including identifying the lowest cost route to the not via destination (which route cannot include the failed component as no advertisement has been sent over this component), and installing the corresponding lowest cost label in according with the routing vector protocol procedure described above. Accordingly at step 1204 the updated LFIB is installed and, in the case of the repairing node, node A, the appropriate forwarding decisions to be implemented upon detection of failure of the failure component are additionally installed. Hence on completion of the process all nodes in the network will have both the identity of the next hop with the cheapest cost to Ba and the label used to send the packet on the not via path.

For example in the case of node A, upon detection of failure link 120 and receipt of a packet destined for node D, hence having an ingress label $A_D$, node A recognizes that this needs to be injected into the not via repair path to Ba, pushes B's label for D, $B_D$ on to the packet and further pushes its egress label for the repair LSP on to the packet. In the topology shown with reference to FIG. 6, node A will have computed that the lowest cost repair route is A X Y Z E B and will retrieve as egress label node X's label for Ba, $X_{Ba}$. Node X similarly will swap its label for Y's label for Ba and so forth until the packet is received at node B after which it will be forwarded in a conventional manner to node D.

Although the discussion above is in the context of failure of a link, for example link 120, it will be further seen that the approach described above in relation to routing vector protocols can be extended to node failure as well. In that case, once again, the repairing node will require the repair end point node's label for the destination which would it not receive normally as these are only propagated to each adjacent node to the repair end point node following normal LDP operation. Accordingly the information can be obtained through a directed LDP session or using an implementation for example of the type described in the Internet-draft "discovering LDP next—next hop labels" of Shen et al., available at the time of this writing in the file "draft-shen-mpls-ldp-nnhop-label-01 in the folder/html of the domain www1.tools.ietf.org on the Internet, according to which a node has information not only on which of the failure node's neighbors to send packets for specific destinations to, but also the labels required for each of those neighbor nodes or "next-next hops". For example the failure node's neighbors can originate the not via information in their LDP messages and the failure node itself can suppress further propagation of the additional information advertisement LDP messages as also described in Bryant et al.

In the case that a component is removed and the network is re-converged then it is desirable to flush the not via path rapidly in some instances rather than awaiting its removal as part of the distance vector protocol arising from the "counting to infinity" approach. This can be achieved for example after the failed link has been removed by sending to each neighbor the additional information advertisement with "flush=true" which will be used at each node to remove the not via entries on the LFIB. In the case of node failure then underlying protocols such as interior gateway protocol (IGP) will notify the neighbors of the removed node that it has disappeared allowing them to issue a proxy flush. Alternatively the nodes can identify withdrawal of label to B by its neighbors in the LDP database and issue a proxy flush or can set their repair costs to node B to be infinity which will flush the repair using the normal distance vector convergence methods.

It will be seen from the approaches described above that the method allows a simple fast reroute repair mechanism across an entire LDP domain even when different regions support different routing protocols, the LDP effectively acting as a routing protocol in its own right.

It will further be appreciated that the approach can be implemented in any appropriate network or environment using any appropriate link state, distance or path vector protocol as appropriate. The manner in which the method described is implemented may be using software, firmware, hardware or any combination thereof and with any appropriate code changes to the various components as will be apparent to the skilled reader without the need for detailed description herein. For example any appropriate information block can be used within LDP or an equivalent label distribution approach to advertise the additional information, and the use of IP addresses both for the normal and not via address of a router or interface can be replaced by any other appropriate identifier provided that they are unique and consistent throughout the LDP domain.

4.0 Implementation Mechanisms—Hardware Overview

Figure 13:
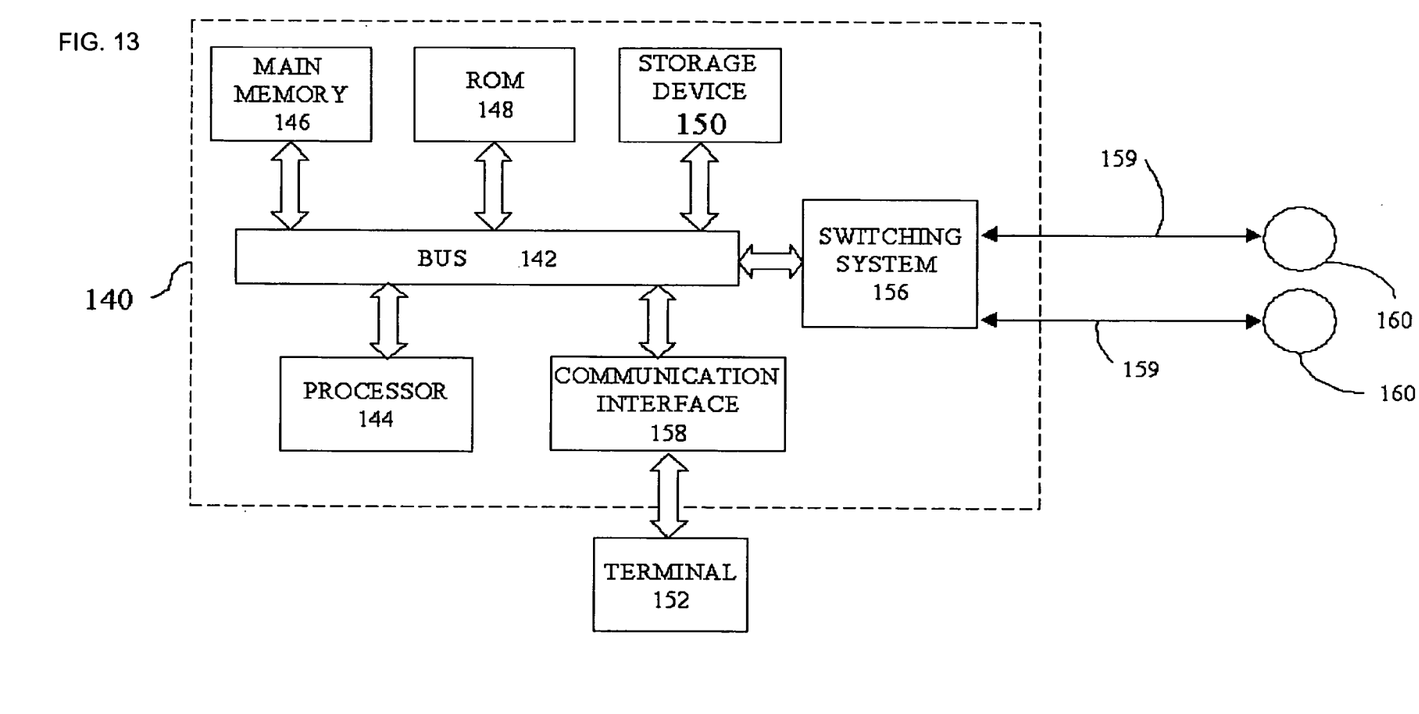
FIG. 13 is a block diagram that illustrates a computer system upon which the method is described herein may be implemented.

FIG. 13 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router, advertising node or repairing node the approach described herein acting as a participating node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Furthermore, the approach can be implemented in relation to pre computed or on-the-fly repair paths computed in relation to failed nodes or links or to components removed or introduced by an administrator or any other equivalent network topology change.

What is claimed is:

1. An apparatus for forwarding data in a data communications network having as components: nodes and links therebetween;
the apparatus comprising one or more processors;
the apparatus configured to forward, before an event of non availability of a component in the network occurs, data towards a destination on a label switched path;
the apparatus configured to advertise to nodes in the network, before the event of non availability of the component in the network occurs, its label for the label switched path and a repair label for a repair label switched path for use in the event of non availability of the component in the network;
the apparatus configured to advertise to a remote node in the network, before the event of non availability of the component occurs, additional information for deriving repair label switched path information at the remote node.

2. An apparatus as claimed in claim 1 configured to advertise its label for the label switched path to each adjacent node.

3. An apparatus as claimed in claim 1 in which the repair label switched path provides a repair path to the apparatus reachable not via said non-available component.

4. An apparatus as claimed in claim 1 in which the additional information comprises link state information.

5. An apparatus as claimed in claim 4 in which the link state information includes an identifier for the apparatus, an identifier for each neighbor of the apparatus, a cost for the apparatus to reach each said neighbor and a repair identifier corresponding to each neighbor.

6. An apparatus as claimed in claim 4 in which repair label switched path advertisement is distributed to all nodes in the network.

7. An apparatus as claimed in claim 4 further comprising a remote node configured to construct the topology from the link state information and derive the repair label switched path information from the topology.

8. An apparatus as claimed in claim 1 in which the additional information comprises information for deriving a repair label switched path according to a routing vector protocol.

9. An apparatus as claimed in claim 8 further configured to treat propagating of the additional information differently via non availability component than via other components.

10. An apparatus as claimed in claim 9 configured to treat propagating differently by only propagating the additional information by components other than the non availability component.

11. An apparatus as claimed in claim 9 configured to treat propagating the additional information differently by propagating the additional information via the non availability node with a differentiating characteristic.

12. An apparatus as claimed in claim 8 in which the additional information includes an identifier of the apparatus acting as an advertising node, an identifier of a remote node acting as repairing node, a cost value and the advertising node repair label.

13. An apparatus as claimed in claim 12 in which the additional information further comprises a flush value for triggering flushing of a stale repair label switched path.

14. An apparatus as claimed in claim 12 further comprising a receiving node configured to receive the additional information, augment the cost value by its own cost from the advertising node from which the additional information was received, the receiving node further configured to replace the received label for the repair LSP from the advertising node with its own repair label and further propagate the additional information.

15. An apparatus as claimed in claim 1 in which the non available component comprises one of a node or a link.

16. An apparatus as claimed in claim 1 further comprising a remote node comprising a repairing node configured to derive repair label switched path information from the additional information and forward repair data via the repair label switched path.

17. An apparatus as claimed in claim 1 configured to forward a label distribution protocol advertisement.

18. A method of forwarding data in a data communications network having as components nodes and links therebetween, wherein the method is performed at an apparatus configured to forward data towards a destination on a label switched path, the method comprising:
advertising to nodes in the network before an event of non availability of a component in the network occurs, a label for the label switched path and a repair label for a repair label switched path for use in the event of non availability of the component in the network; and
advertising to a remote node in the network before the event of non availability of the component occurs, additional information for deriving repair label switched path information at the remote node;
wherein the apparatus comprises one or more processors.

19. A non-transitory computer readable storage medium comprising one or more sequences of instructions which, when executed by one or more processors, cause the one or more processors to perform steps comprising:
forwarding data in a data communications network having as components nodes and links therebetween, wherein the forwarding is performed at an apparatus configured to forward data towards a destination on a label switched path, wherein the forwarding comprises:
advertising to nodes in the network before an event of non availability of a component in the network occurs, a label for the label switched path and a repair label for a repair label switched path for use in the event of non availability of the component in the network, and
advertising to a remote node in the network before the event of non availability of the component occurs, additional information for deriving repair label switched path information at the remote node.

20. The computer readable storage medium as claimed in claim 19, wherein the repair label switched path provides a repair path to the apparatus reachable not via said non-available component.

21. The computer readable storage medium as claimed in claim 19, wherein the additional information comprises link state information.

22. The computer readable storage medium as claimed in claim 21, wherein the link state information includes an identifier for the apparatus, an identifier for each neighbor of the apparatus, a cost for the apparatus to reach each said neighbor and a repair identifier corresponding to each neighbor.

23. The computer readable storage medium as claimed in claim 19, wherein the steps further comprise constructing the topology from the link state information at the remote node and deriving the repair label switched path information from the topology.

24. The computer readable storage medium as claimed in claim 19, wherein the steps further comprising treating propagating of the additional information differently via non availability component than via other components.

25. The computer readable storage medium as claimed in claim 19, wherein the steps further comprising propagating the additional information only by components other than the non availability component.

26. The computer readable storage medium as claimed in claim 19, wherein the additional information comprises an identifier of the apparatus acting as an advertising node, an identifier of the remote node acting as a repairing node, and a cost value.

27. The computer readable storage medium as claimed in claim 19, wherein the additional information comprises a flush value for triggering flushing of a stale repair label switched path.

28. The computer readable storage medium as claimed in claim 19, wherein the non available component comprises one of a node or a link.

29. The computer readable storage medium as claimed in claim 19, wherein the steps further comprising the remote node deriving the repair label switched path information from the additional information and forwarding repair data via the repair label switched path.

30. An apparatus for forwarding data in a data communication network having as components node and links therebetween, the apparatus being configured to forward data towards a destination on a label switched path, the apparatus further configured to receive (a) an advertisement of labels from an advertising node, the advertisement of labels including a label for the label switched path, a repair label for a repair label switched path for use in an event of non availability of a component in the network, and (b) additional information for deriving the repair label switched path for use in the event of non-availability of the component in the network and deriving repair label switched path information therefrom, wherein the apparatus receives the advertisement of labels and the additional information before the event of non-availability of the component in the network occurs, wherein the apparatus comprises a processor.

31. An apparatus as claimed in claim 30 in which the additional information comprises link state information, the apparatus configured to derive the repair information according to a link state protocol.

32. An apparatus as claimed in claim 30 the apparatus configured to receive additional information comprising routing vector information, the apparatus configured to derive repair label switch path information using a routing vector protocol.

* * * * *